(12) United States Patent
Hong et al.

(10) Patent No.: US 12,416,139 B2
(45) Date of Patent: Sep. 16, 2025

(54) FUEL CELL WATER TREATMENT SYSTEM

(71) Applicants: HYUNDAI MOTOR COMPANY, Seoul (KR); KIA CORPORATION, Seoul (KR)

(72) Inventors: Jeong Hwan Hong, Hwaseong-si (KR); Jong Min Jang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 140 days.

(21) Appl. No.: 18/077,805

(22) Filed: Dec. 8, 2022

(65) Prior Publication Data

US 2024/0011263 A1 Jan. 11, 2024

(30) Foreign Application Priority Data

Jul. 11, 2022 (KR) .......................... 10-2022-0085149

(51) Int. Cl.
*E03C 1/044* (2006.01)
*G05D 23/19* (2006.01)
(Continued)

(52) U.S. Cl.
CPC ............. *E03C 1/044* (2013.01); *G05D 23/19* (2013.01); *H01M 8/04291* (2013.01); *E03C 2001/0418* (2013.01)

(58) Field of Classification Search
CPC . E03C 1/044; E03C 2001/0418; G05D 23/19; H01M 8/04291; H01M 8/04156; H01M 8/04029; H01M 8/0432; H01M 8/04701; H01M 2250/20; Y02E 60/50; B60H 1/32281; B60R 15/02
See application file for complete search history.

(56) References Cited

U.S. PATENT DOCUMENTS 7,213,664 B2 5/2007 Nomura et al.
7,270,899 B2 9/2007 Kato et al.
(Continued)

FOREIGN PATENT DOCUMENTS

JP 2003275703 A 9/2003
JP 2004055378 A 2/2004
(Continued)

OTHER PUBLICATIONS

Dear My Hero'—Hydrogen Cleaning Truck of Hyundai Motor Group, Youtube, Dec. 30, 2021, 3 pages, https://www.youtube.com/watch?v=TTbLuC_UXFQ.

*Primary Examiner* — Donnell A Long
(74) *Attorney, Agent, or Firm* — Lempia Summerfield Katz LLC

(57) ABSTRACT

Disclosed is a system for treating fuel cell water discharged from a fuel cell using hydrogen as a fuel. The fuel cell water treatment system may include a fuel cell water storage device that receives and stores fuel cell water discharged from a fuel cell, a temperature adjustment device that adjusts a temperature of the fuel cell water stored in the fuel cell water storage device, and a washing device. In particular, when a preset condition is satisfied, and the washing device receives the fuel cell water from the fuel cell water storage device and discharges the fuel cell water through a faucet head of the washing device.

16 Claims, 5 Drawing Sheets

(51) Int. Cl.
*H01M 8/04291* (2016.01)
*E03C 1/04* (2006.01)

(56) References Cited

U.S. PATENT DOCUMENTS

| | | | |
|---|---|---|---|
| 9,963,240 B2 * | 5/2018 | Boodaghians | ............ H02J 1/14 |
| 2002/0177022 A1 * | 11/2002 | Shimonosono | ... H01M 8/04029 |
| | | | 429/434 |
| 2002/0182463 A1 * | 12/2002 | Jones | ................ H01M 8/04559 |
| | | | 429/432 |
| 2003/0031902 A1 * | 2/2003 | Balasubramanian | ........................ |
| | | | H01M 8/04119 |
| | | | 429/408 |
| 2004/0101725 A1 | 5/2004 | Kato et al. | |
| 2005/0055766 A1 * | 3/2005 | Warning | ................. B60R 15/02 |
| | | | 4/619 |
| 2006/0033520 A1 | 2/2006 | Mai | |
| 2009/0004518 A1 | 1/2009 | Fujita | |
| 2016/0380279 A1 | 12/2016 | Breit et al. | |
| 2023/0411653 A1 | 12/2023 | Hong | |

FOREIGN PATENT DOCUMENTS

| | | |
|---|---|---|
| JP | 2004168101 A | 6/2004 |
| JP | 2011000922 A | 1/2011 |
| JP | 2016118275 A | 6/2016 |
| KR | 20060033520 A | 4/2006 |
| KR | 20200127298 A | 11/2020 |
| KR | 20230172900 A | 12/2023 |

* cited by examiner

FUEL CELL WATER TREATMENT SYSTEM

CROSS-REFERENCE TO RELATED APPLICATION

This application claims the benefit of and priority to Korean Patent Application No. 10-2022-0085149, filed in the Korean Intellectual Property Office on Jul. 11, 2022, the entire contents of which are incorporated herein by reference.

TECHNICAL FIELD

The present disclosure relates to a system that adjusts the temperature of water (fuel cell water) generated in a process of generating electricity in a fuel cell to make the fuel cell water suitable for use as washing water.

BACKGROUND

The statements in this section merely provide background information related to the present disclosure and may not constitute prior art.

Hydrogen fuel cells are a power generation system that directly converts chemical energy into electrical energy, without a combustion process, by an electrochemical reaction that occurs when hydrogen as a fuel gas and oxygen as an oxidizing gas are mixed. Such hydrogen fuel cells are a high-efficiency clean energy conversion device that may continuously generate electricity by receiving hydrogen and oxygen from external sources.

Such hydrogen fuel cells discharge water and steam as byproduct of the reaction in the hydrogen fuel cells.

The hydrogen fuel cells are being applied as power sources for various mobility devices such as vehicles, ships, trains, aircrafts, and the like.

SUMMARY

The present disclosure has been made to solve the above-mentioned problems occurring in the prior art while advantages achieved by the prior art are maintained intact.

An aspect of the present disclosure provides a system that adjusts the temperature of fuel cell water generated in a hydrogen fuel cell to make the fuel cell water suitable for use as washing water.

Further, another aspect of the present disclosure provides a system capable of improving cooling efficiency of the hydrogen fuel cell by decreasing the temperature of fuel cell cooling water using the fuel cell water.

The technical aspects of the present disclosure are not limited to the aspects described above, and those having ordinary skill in the art should clearly understand other technical aspects not described from the following descriptions.

According to an aspect of the present disclosure, there is provided a fuel cell water treatment system including a fuel cell water storage device that receives and stores fuel cell water discharged from a fuel cell. The fuel cell water treatment system further includes: a temperature adjustment device that adjusts a temperature of the fuel cell water stored in the fuel cell water storage device when a preset condition is satisfied, and a washing device that receives the fuel cell water from the fuel cell water storage device and discharges the fuel cell water through a faucet head of the washing device.

BRIEF DESCRIPTION OF THE DRAWINGS

The above and other objects, features and advantages of the present disclosure should be more apparent from the following detailed description taken in conjunction with the accompanying drawings.

Figure 1:
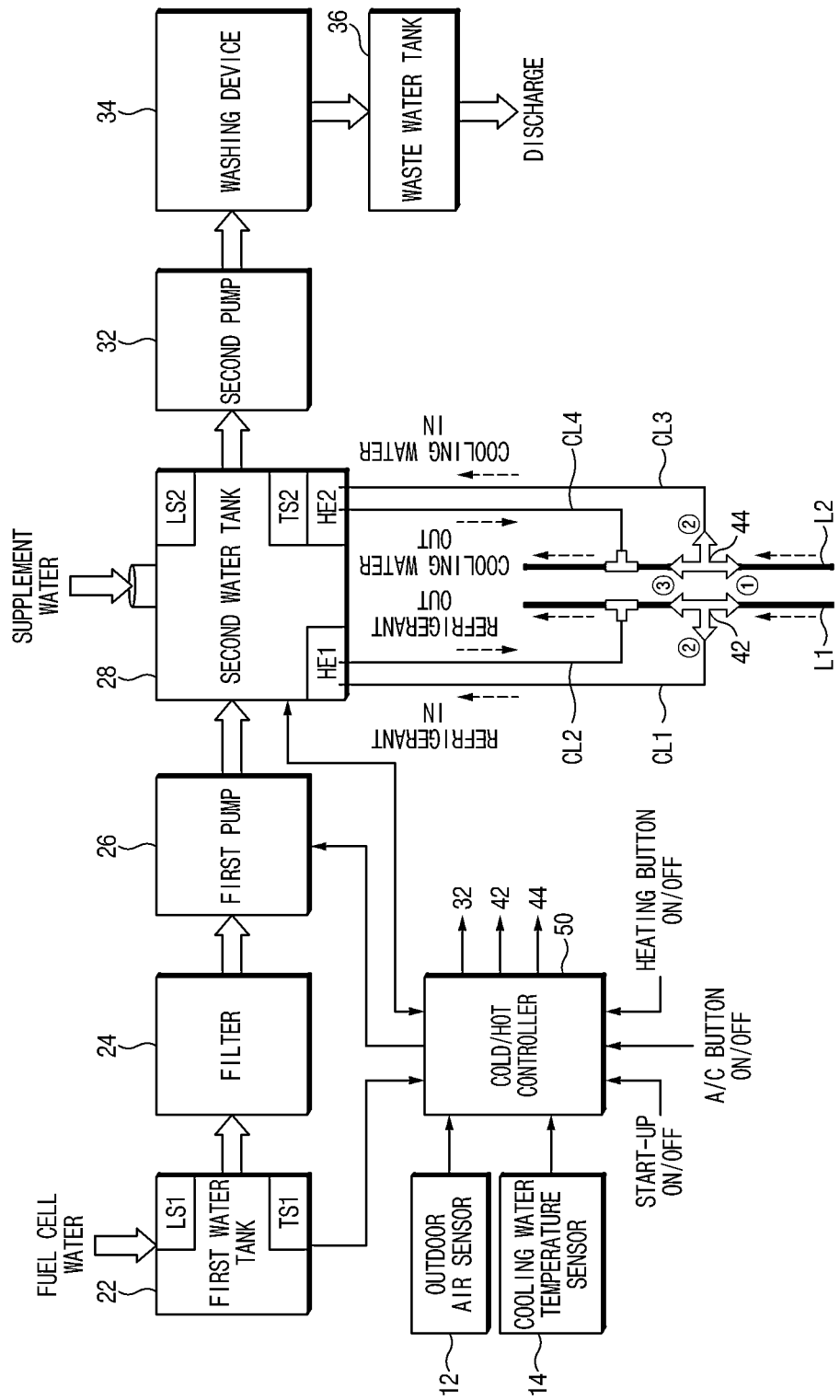
FIG. 1 is a block diagram schematically illustrating a configuration of a fuel cell water treatment system according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

When a component, device, element, or the like of the present disclosure is described as having a purpose or performing an operation, function, or the like, the component, device, or element should be considered herein as being "configured to" meet that purpose or to perform that operation or function.

Figure 2:
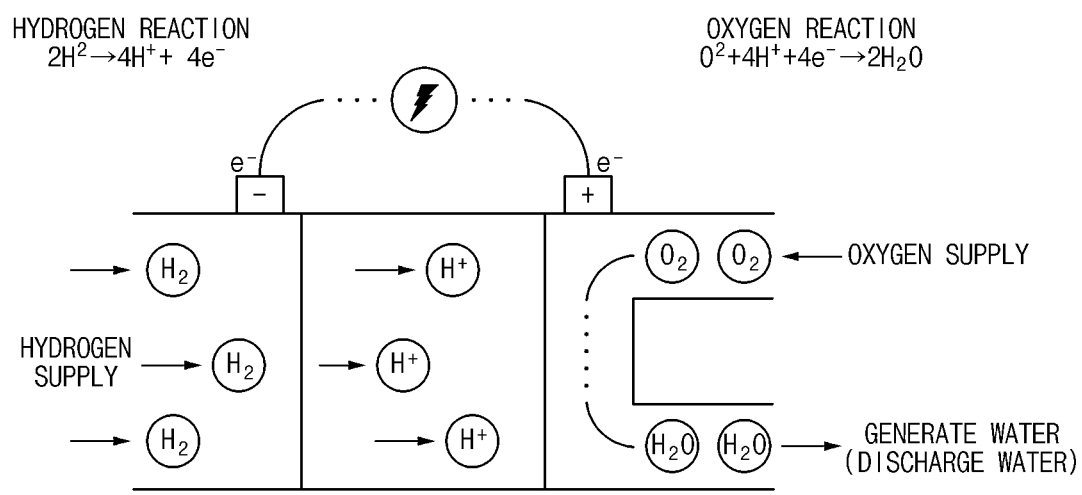
FIG. 2 is a view for describing a principle of generating electricity in a hydrogen fuel cell according to an embodiment of the present disclosure.

FIG. 1 is a block diagram schematically illustrating a configuration of a fuel cell water treatment system according to an embodiment of the present disclosure, and FIG. 2 is a view for describing a principle of generating electricity in a hydrogen fuel cell according to an embodiment of the present disclosure. Further, FIG. 3 is a view exemplarily illustrating a state in which a washing device is installed in a hydrogen electric vehicle according to an embodiment of the present disclosure.

In the following description, for convenience of description, a fuel cell water treatment system according to the present disclosure is applied to a hydrogen electric vehicle. However, the fuel cell water treatment is not limited to the hydrogen electric vehicle and may be applied to other mobility devices capable of using the hydrogen fuel cell as a power source.

Figure 3:
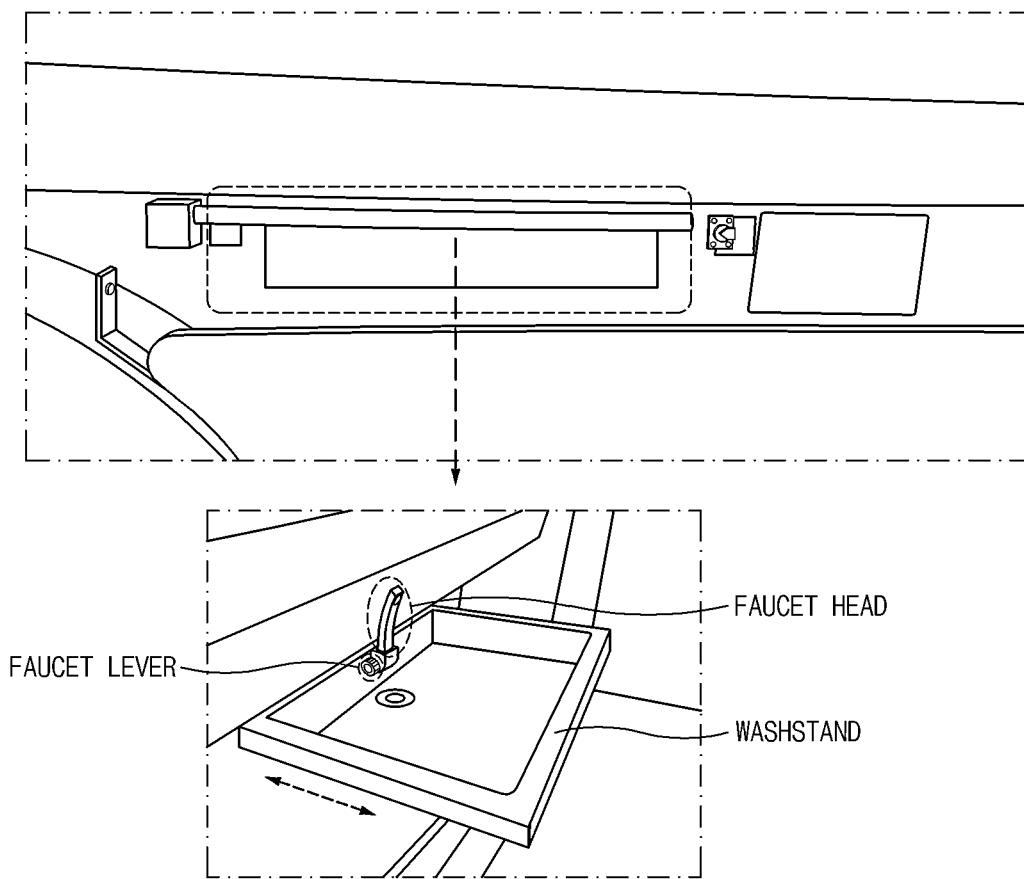
FIG. 3 is a view illustrating a state in which a washing device is installed in a hydrogen electric vehicle according to an embodiment of the present disclosure.

Referring to FIGS. 1 to 3, the fuel cell water treatment system may include an outdoor air sensor 12, a cooling water temperature sensor 14, a first water tank 22, and a filter 24. The fuel cell water treatment system may further include: a first pump 26, a second water tank 28, a second pump 32, a washing device 34, a waste water tank 36, a refrigerant valve 42, a cooling water valve 44, and a cold/hot controller 50.

The outdoor air sensor 12 may detect an external temperature of the hydrogen electric vehicle and provide the detected information to the cold/hot controller 50.

The cooling water temperature sensor 14 may detect the temperature of cooling water (fuel cell cooling water) for cooling a fuel cell and provide the detected information to the cold/hot controller 50. The fuel cell cooling water may flow along a cooling water line L2.

The first water tank 22 may receive and primarily store water (fuel cell water) generated in a process of generating electricity in the fuel cell of the hydrogen electric vehicle. In one embodiment, the first water tank 22 may include a level sensor LS1 and a temperature sensor TS1 to detect the amount and temperature of the stored fuel cell water. The first water tank 22 may provide the detected information to the cold/hot controller 50. In detail, the level sensor LS1 of the first water tank 22 detects a level of the stored fuel cell water and provides the detected information to the cold/hot controller 50. Further, the temperature sensor TS1 of the first water tank 22 detects the temperature of the stored fuel cell water and provides the detected information to the cold/hot controller 50.

As illustrated in FIG. 2, the fuel cell of the hydrogen electric vehicle is a power generation system that directly converts chemical energy into electrical energy, without a combustion process, through an electrochemical reaction that occurs when hydrogen $H_2$ as a fuel gas and oxygen $O_2$ as an oxidizing gas are mixed together. When the hydrogen $H_2$ is supplied to the fuel cell, the hydrogen $H_2$ is separated into electrons $e^-$ and hydrogen ions $H^+$. In this case, the generated electrons are transferred to an external circuit and used as a power source of the hydrogen electric vehicle. The hydrogen ions separated from the hydrogen pass through an electrolyte membrane and react with oxygen in air supplied to the fuel cell opposite to the electrolyte membrane to generate water ($H_2O$). In the present embodiment, the water generated in this way may be supplied to the first water tank 22 through an exhaust pipe without being discharged to the outside of the hydrogen electric vehicle.

In another embodiment, the filter 24 may be located on an outlet side of the first water tank 22 and may filter contaminants (particulates, microorganisms, organic matters, and the like) contained in the fuel cell water while the first pump 26 is operated to move the fuel cell water stored in the first water tank 22 to the second water tank 28. For example, the water generated in the fuel cell may be moved to the first water tank 22 through the exhaust pipe made of metal. In this process, various foreign substances may be contained in the fuel cell water. The filter 24 removes such foreign substances from the fuel cell water so that a user may use the fuel cell water as washing water for washing a body. Further, the fuel cell water is acidic at a pH of 5.2, and thus may not be used as drinking water. Thus, the filter 24 may remove the acidity of the fuel cell water and purify the fuel cell water into neutral water having a drinkable level (pH in a range of from 5.8 to 8.6).

The first pump 26 may operate under control of the cold/hot controller 50 and move the fuel cell water stored in the first water tank 22 to the second water tank 28. For example, the first pump 26 may include a water pump.

The second water tank 28 may temporarily store the fuel cell water provided from the first water tank 22 by the first pump 26. For example, the second water tank 28 may temporarily store the fuel cell water before the fuel cell water is used as the washing water and adjust the temperature of the stored fuel cell water. Further, the second water tank 28 may be used as an auxiliary water tank for storing a large amount of the fuel cell water while preventing the fuel cell water from being filled in the first water tank 22 by a predetermined amount or more.

The second water tank 28 may include sensors that detect the amount and temperature of the stored fuel cell water and provide the detected information to the cold/hot controller 50. For example, the second water tank 28 may include a level sensor LS2 that detects a level of the stored fuel cell water and provides the detected information to the cold/hot controller 50. Further, the second water tank 28 may include a temperature sensor TS2 that detects the temperature of the stored fuel cell water and provides the detected information to the cold/hot controller 50.

Further, the second water tank 28 may include heat exchangers HE1 and HE2 that are configured to perform heat exchange between the stored fuel cell water and a fluid introduced from the outside.

For example, the second water tank 28 may include the first heat exchanger HE1 for cooling the fuel cell water by performing heat exchange between the fuel cell water stored in the second water tank 28 and a refrigerant. The first heat exchanger HE1 may be connected to the refrigerant valve 42 through a connection line CL1 and connected to a refrigerant line L1 through a connection line CL2. For example, the first heat exchanger HE1 may receive the refrigerant through the connection line CL1 by the refrigerant valve 42 (refrigerant IN), and the refrigerant supplied into the first heat exchanger HE1 may be discharged to the refrigerant line L1 through the connection line CL2 again (refrigerant OUT). In one embodiment, the first heat exchanger HE1 may include an air-cooled heat exchanger (for example, a chiller) using the refrigerant. In this case, the refrigerant line L1 may include a line through which a refrigerant of an air conditioner of the hydrogen electric vehicle moves.

Further, the second water tank 28 may include the second heat exchanger HE2 that performs heat exchange between the fuel cell water stored in the second water tank 28 and the fuel cell cooling water to increase the temperature of the fuel cell water and decrease the temperature of the fuel cell cooling water. In other words, when a user wants to increase the temperature of the fuel cell water stored in the second water tank 28, the heat exchange using the fuel cell cooling water without using a separate heater is performed. Thus, the temperature of the fuel cell water increases, and at the same time, the temperature of the fuel cell cooling water decreases. The second heat exchanger HE2 may be connected to the cooling water valve 44 through a connection line CL3 and connected to the cooling water line L2 through a connection line CL4. For example, the second heat exchanger HE2 may receive the cooling water through the connection line CL3 by the cooling water valve 44 (cooling water IN), and the cooling water supplied into the second heat exchanger HE2 may be discharged to the cooling water line L2 through the connection line CL4 again (cooling water OUT). In one embodiment, the second heat exchanger HE2 may include a water-cooled heat exchanger using cooling water. In this case, the cooling water line L2 may include a line through which the cooling water for cooling the fuel cell of the hydrogen electric vehicle moves.

Further, the second water tank 28 may include: a supplement water inlet port through which water (i.e., supplement water) may be received from the outside, and a water inlet port which is connected to the first pump 26. The fuel cell water is received through the water inlet port. For example, in a state in which the hydrogen electric vehicle is turned off, when a user (e.g., a driver) wants to use the water stored in the second water tank 28 as washing water, and when the water in the second water tank 28 is insufficient or the water in the second water tank 28 is hot and thus it is required to cooling the water, a separate water inlet port may be further installed in the second water tank 28 to receive the supplement water from the outside.

The second pump 32 may supply the fuel cell water stored in the second water tank 28 to the washing device 34. The second pump 32 may be automatically operated when a faucet lever of the washing device 34 is operated.

The washing device 34 may allow a user to use the water stored in the second water tank 28 as the washing water or the like. As illustrated in FIG. 3, the washing device 34 may be installed on a lateral side of the hydrogen electric vehicle and may be retracted into or extracted from the lateral side in a sliding manner. In other words, the washing device 34 may be formed in a sliding structure in which a user may use the washing device 34 by pulling and extracting a washstand of the washing device 34 by a hand from the vehicle. The user may push the washstand into the vehicle and put the washstand back into the vehicle after the use. The washing device 34 may include the washstand, a faucet head, and the faucet lever. An angle of the faucet head may be adjusted so that the faucet head may be folded downward when the washstand is pushed and retracted into the hydrogen electric vehicle and may stand upright after the washstand is pulled and extracted.

The waste water tank 36 may be connected to a drain pipe of the washstand and store waste water discharged through the washstand. The waste water tank 36 may include an outlet through which the stored waste water may be discharged to the outside. The waste water tank 36 may include an outlet port, and a level sensor that detects a level of the stored waste water and provide the detected information to the cold/hot controller 50. The outlet port of the waste water tank 36 may be manually opened or closed by a user or automatically opened or closed under control of the cold/hot controller 50.

The refrigerant valve 42 may allow the refrigerant line L1 and the connection line CL1 to selectively communicate with each other according to a control signal (a first flow control signal) from the cold/hot controller 50 to adjust a direction in which the refrigerant flows. For example, the refrigerant valve 42 allows port ① and port ③ to communicate with each other so that the refrigerant may flow only through the refrigerant line L1 or allows port ① and port ② to communicate with each other so that the refrigerant in the refrigerant line L1 may be introduced into the first heat exchanger HE1 via the connection line CL1, under the control of the cold/hot controller 50.

The cooling water valve 44 may allow the cooling water line L2 and the connection line CL3 to selectively communicate with each other according to a control signal (a second flow control signal) from the cold/hot controller 50 to adjust a direction in which the cooling water flows. For example, the cooling water valve 44 allows port ① and port ③ to communicate with each other so that the fuel cell cooling water may flow only through the cooling water line L2 or allows port ① and port ② to communicate with each other so that the fuel cell cooling water in the cooling water line L2 may be introduced into the second heat exchanger HE2 via the connection line CL3.

The cold/hot controller 50 may control the overall operation of the fuel cell water treatment system. When a preset condition is satisfied, the cold/hot controller 50 may allow a fluid (the refrigerant or the fuel cell cooling water) to be automatically introduced into the heat exchanger HE1 or HE2 in the second water tank 28. In other words, the cold/hot controller 50 may control heat exchange between the introduced fluid and the fuel cell water stored in the second water tank 28, and thus may decrease or increase the temperature of the fuel cell water. Through this heat exchange, the cold/hot controller 50 may also decrease the temperature of the fuel cell cooling water.

For example, after the hydrogen electric vehicle is started up (ON), the cold/hot controller 50 may determine whether the external temperature of the hydrogen electric vehicle is higher than a preset temperature (for example, 15 degrees Celsius (° C.) based on the information detected by the outdoor air sensor 12. The cold/hot controller 50 may identify levels and temperatures of the fuel cell water stored in the first water tank 22 and the second water tank 28 through the sensors LS1, LS2, TS1, and TS2 in a state in which the external temperature is higher than the preset temperature and a cooling button is turned on for a certain period of time (for example, one minute). When the levels of and the temperatures of the water in the first water tank 22 and the second water tank 28 correspond to preset conditions, the cold/hot controller 50 may control the refrigerant valve 42 and the first heat exchanger HE1 to perform heat exchange between the refrigerant and the fuel cell water in the second water tank 28 so as to cool the fuel cell water in the second water tank 28. When a specific event occurs while cooling the fuel cell water in the second water tank 28, for example, when a user (a driver) continuously operates an air conditioner (A/C) button, the cold/hot controller 50 may terminate the heat exchange for cooling the fuel cell water.

Further, when the external temperature of the hydrogen electric vehicle is lower than a preset temperature (for example, 5° C.) after the hydrogen electric vehicle is started up (ON), the cold/hot controller 50 may identify the level of the first water tank 22, the level of and the temperature of the water in the second water tank 28, and the temperature of the fuel cell cooling water. When the level of the first water tank 22, the level of and the temperature of the water in the second water tank 28, and the temperature of the fuel cell cooling water correspond to preset conditions, the cold/hot controller 50 may control the cooling water valve 44 and the second heat exchanger HE2 to perform heat exchange between the fuel cell cooling water and the fuel cell water in the second water tank 28 so as to cool the fuel cell cooling water while increasing the temperature of the fuel cell water stored in the second water tank 28. In other words, when the external temperature of the hydrogen electric vehicle is low as in winter, since the fuel cell water in the second water tank 28 is quickly cooled so that the temperature is lowered, this is utilized for cooling the fuel cell cooling water. Thus, cooling efficiency of the fuel cell cooling water may be improved, and at the same time, the temperature of the fuel cell water may be increased warmly. When a specific event occurs during the heat exchange between the fuel cell cooling water and the fuel cell water, for example, when a user (a driver) continuously operates a heating button, the cold/hot controller 50 may terminate the heat exchange.

When the temperature of the fuel cell water is decreased or increased, the cold/hot controller 50 may notify a user of this fact by lighting a character informing of this fact on a cluster. For example, when the fuel cell water is being currently cooled, the cold/hot controller 50 may display, on the cluster, a guide message to press the air conditioner (A/C) button twice in succession in order to terminate this cooling. Alternatively, when the temperature of the fuel cell water is being currently increased, the cold/hot controller 50 may display, on the cluster, a guide message to press the heating button twice in succession in order to terminate this temperature increasing. Further, the cold/hot controller 50 may cause to display, on the display, a current temperature of the fuel cell water in the second water tank 28.

Further, the fuel cell water treatment system may further include a switch device (not illustrated) that allows a user to manually control operation of the cold/hot controller 50. For example, regardless of the external temperature of the vehicle, when a user turns on the switch or selects a specific menu, the cold/hot controller 50 may control the valves 42 and 44 and the heat exchangers HE1 and HE2 to perform heat exchange.

Figure 4:
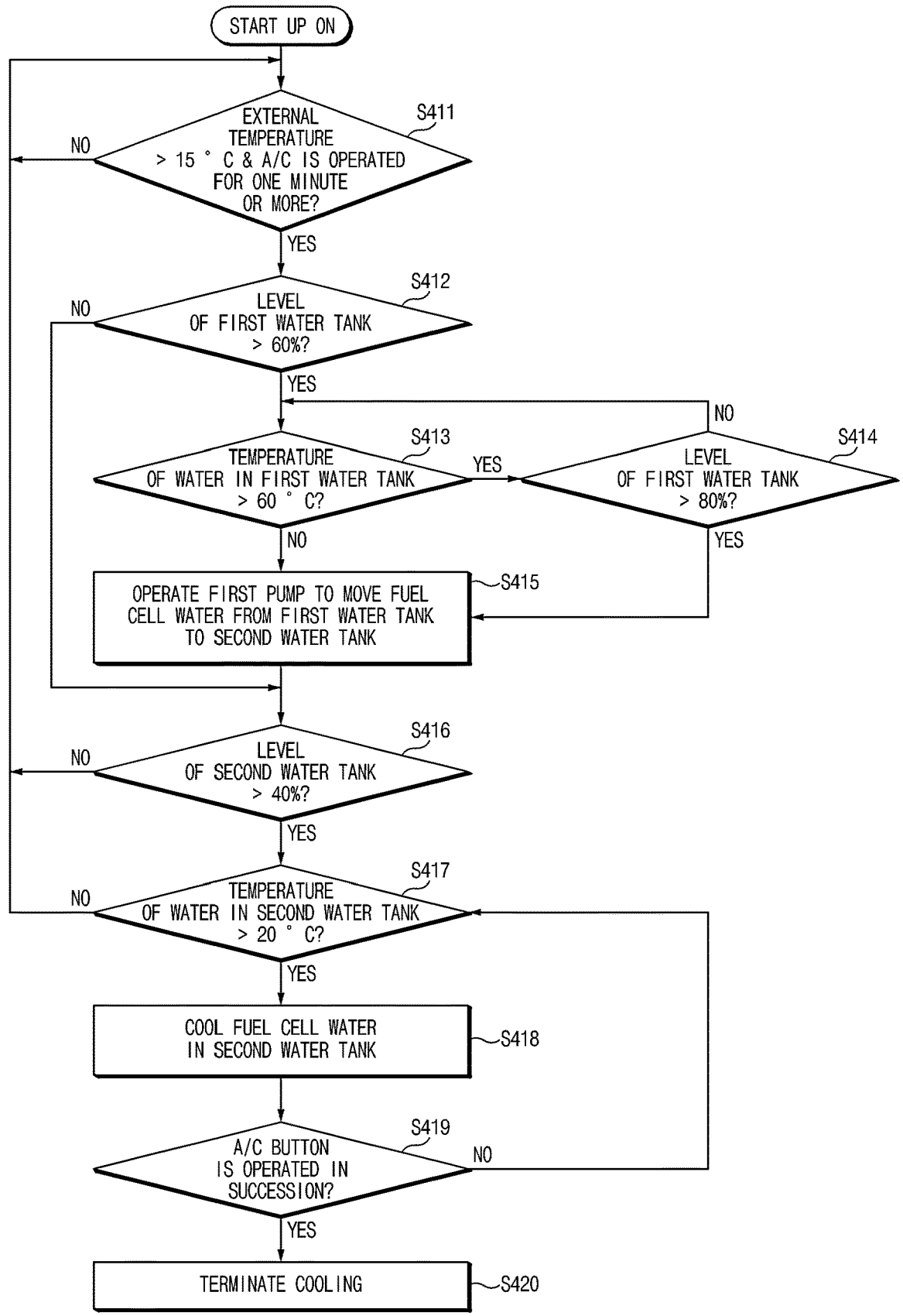
FIG. 4 is a flowchart for describing a process of cooling fuel cell water in the fuel cell water treatment system of FIG. 1.

FIG. 4 is a flowchart for describing a process of cooling fuel cell water in the fuel cell water treatment system of FIG. 1.

When the hydrogen electric vehicle is started up (ON), the cold/hot controller 50 may determine whether the external temperature of the hydrogen electric vehicle is higher than a preset temperature or whether the air conditioner is operated for a preset time or more (S411).

For example, the cold/hot controller 50 may determine, on the basis of the information from the outdoor air sensor 12, whether the external temperature of the hydrogen electric vehicle is higher than 15° C. When the external temperature is higher than 15° C., the cold/hot controller 50 may determine whether the air conditioner is being operated for one minute or more. The determining of whether the air conditioner is being operated for one minute or more is for distinguishing a case in which the air conditioner is operated for a while for dehumidification, and as needed, whether the air conditioner is operated may not be considered in operation S411.

When the external temperature is higher than the preset temperature and the air conditioner is being operated for the preset time or more in the determination result in operation S411, the cold/hot controller 50 may determine whether the level of the first water tank 22 exceeds a preset level on the basis of the information received from the level sensor LS1 installed in the first water tank 22 (S412).

For example, the cold/hot controller 50 may determine whether the level of the first water tank 22 exceeds 60% of the highest level.

When the level of the first water tank 22 exceeds 60% of the highest water level in the determination result in operation S412, the cold/hot controller 50 may determine whether the temperature of the fuel cell water in the first water tank 22 is higher than the preset temperature on the basis of the information received from the temperature sensor TS1 (S413).

For example, the cold/hot controller 50 may determine whether the temperature of the fuel cell water in the first water tank 22 is higher than 60° C.

When the temperature of the fuel cell water in the first water tank 22 is higher than 60° C. in the determination result in operation S413, the cold/hot controller 50 may determine whether the level of the first water tank 22 exceeds the preset level (S414).

For example, the cold/hot controller 50 may determine whether the level of the first water tank 22 exceeds 80% of the highest level.

When the temperature of the fuel cell water in the first water tank 22 is not higher than 60° C. in the determination result in operation S413 or when the level of the first water tank 22 exceeds 80% of the highest level in the determination result in operation S414, the cold/hot controller 50 may operate the first pump 26 to move the fuel cell water stored in the first water tank 22 to the second water tank 28 (S415).

In the present embodiment, only when the temperature of the water in the first water tank 22 is not higher than 60° C., the cold/hot controller 50 may move the fuel cell water in the first water tank 22 to the second water tank 28. However, even when the temperature of the water in the first water tank 22 is higher than 60° C., when the amount of the fuel cell water stored in the first water tank 22 exceeds 80% of the highest level and thus a space for additional storage in the first water tank 22 is insufficient, the cold/hot controller 50 may forcibly move the fuel cell water in the first water tank 22 to the second water tank 28 even when the temperature of the water in the first water tank 22 is higher than 60° C.

In this case, until the level of the first water tank 22 reaches the reference value (60%) in operation S412, the cold/hot controller 50 may forcibly move the fuel cell water in the first water tank 22 to the second water tank 28. In the present embodiment, the reason for operating the pump when the level of the first water tank 22 exceeds 60% is that, when the pump is operated in a state in which the water level is too low, the pump may malfunction, and frequent operation of the pump is prevented.

When the level of the first water tank 22 does not exceed 60% of the highest level or the fuel cell water in the first water tank 22 is moved to the second water tank 28 in the determination result in operation S412, the cold/hot controller may determine whether the level of the second water tank 28 exceeds a preset level on the basis of the information received from the level sensor LS2 installed in the second water tank 28 (S416).

For example, the cold/hot controller 50 may determine whether the level of the second water tank 28 exceeds 40% of the highest level.

When the level of the second water tank 28 exceeds 40% of the highest level in the determination result in operation S416, the cold/hot controller 50 may determine whether the temperature of the water in the second water tank 28 exceeds the preset temperature on the basis of the information received from the temperature sensor TS2 installed in the second water tank 28 (S417).

For example, the cold/hot controller 50 may determine whether the temperature of the water in the second water tank 28 is higher than 20° C.

When the temperature of the water in the second water tank 28 is higher than 20° C. in the determination result in operation S417, the cold/hot controller 50 may cool the fuel cell water in the second water tank 28 (S418).

For example, the cold/hot controller 50 may output the first flow control signal to the refrigerant valve 42 to cut off (i.e., close) the connection between port ① and port ③ and then connect port ① and port ② in the refrigerant valve 42 so that the refrigerant in the refrigerant line L1 may be introduced into the first heat exchanger HE1 via the connection line CL1. The cold/hot controller 50 may operate the first heat exchanger HE1 to allow the heat exchange between the refrigerant in the first heat exchanger HE1 and the fuel cell water in the second water tank 28 so as to cool the fuel cell water.

When the cooling of the fuel cell water in the second water tank 28 starts, the cold/hot controller 50 may output a message informing of this fact to the cluster to inform a user of this fact. In addition, when a user wants to terminate the cooling of the fuel cell water, for example, the cold/hot controller 50 may output a message to press the air conditioner (A/C) button in succession to the cluster together.

When the air conditioner (A/C) button is operated in succession (S419) while the fuel cell water is cooled, the cold/hot controller 50 may terminate the cooling of the fuel cell water (S420).

In this case, the refrigerant valve 42 may block flow of the refrigerant to port ② and allow port ① and port ③ to fluidly communicate with each other again.

When the air conditioner (A/C) button is not operated in succession, the cold/hot controller 50 may perform the heat exchange for cooling the fuel cell water in succession until the temperature of the fuel cell water in the second water tank 28 reaches the reference value (20° C.) in operation S417.

In the embodiment, it has been described that, when a user operates the air conditioner (A/C) button in succession, the cooling is terminated. However, this is merely an embodiment, and the cooling may be terminated through another separate switching device or a menu. Further, in the embodiment, operation S412 to operation S415 may be omitted. For example, when the external temperature is higher than the preset temperature and the air conditioner is operated for the preset time or more (S411), the cold/hot controller 50 may directly perform operation S416 to operation S420.

Thereafter, when a user operates the faucet lever of the washing device 34, the second pump 32 is automatically operated, and thus the cooled fuel cell water in the second water tank 28 may be discharged to the washstand through the faucet head of the washing device 34. The fuel cell water discharged through the faucet head and used as the washing water may be stored in the waste water tank 36 through the drain pipe of the washstand.

When a storage amount of the second water tank 28 is insufficient, the second water tank 28 may include a supplement water inlet port through which the supplement water may be received so that a user may supplement water to the second water tank 28.

The cold/hot controller 50 may monitor the level of the waste water tank 36 through the level sensor of the waste water tank 36, and may, when the level of the waste water tank 36 is higher than a preset level, notify a user of this fact to induce discharge from the waste water tank 36. That is, when the waste water is forcibly discharged, the surroundings may be contaminated. Thus, the cold/hot controller 50 may first output a notification message to a user to allow the user to discharge the waste water at an appropriate place.

In the above-described embodiment, it has been described that the cold/hot controller 50 automatically cools the fuel cell water in the second water tank 28 according to the external temperature of the hydrogen electric vehicle and the states of the fuel cell water stored in the first water tank 22 and the second water tank 28. However, when a user makes a cooling request through a separate switching device (or a menu), the cold/hot controller 50 may directly perform the heat exchange regardless of the above-described conditions.

Figure 5:
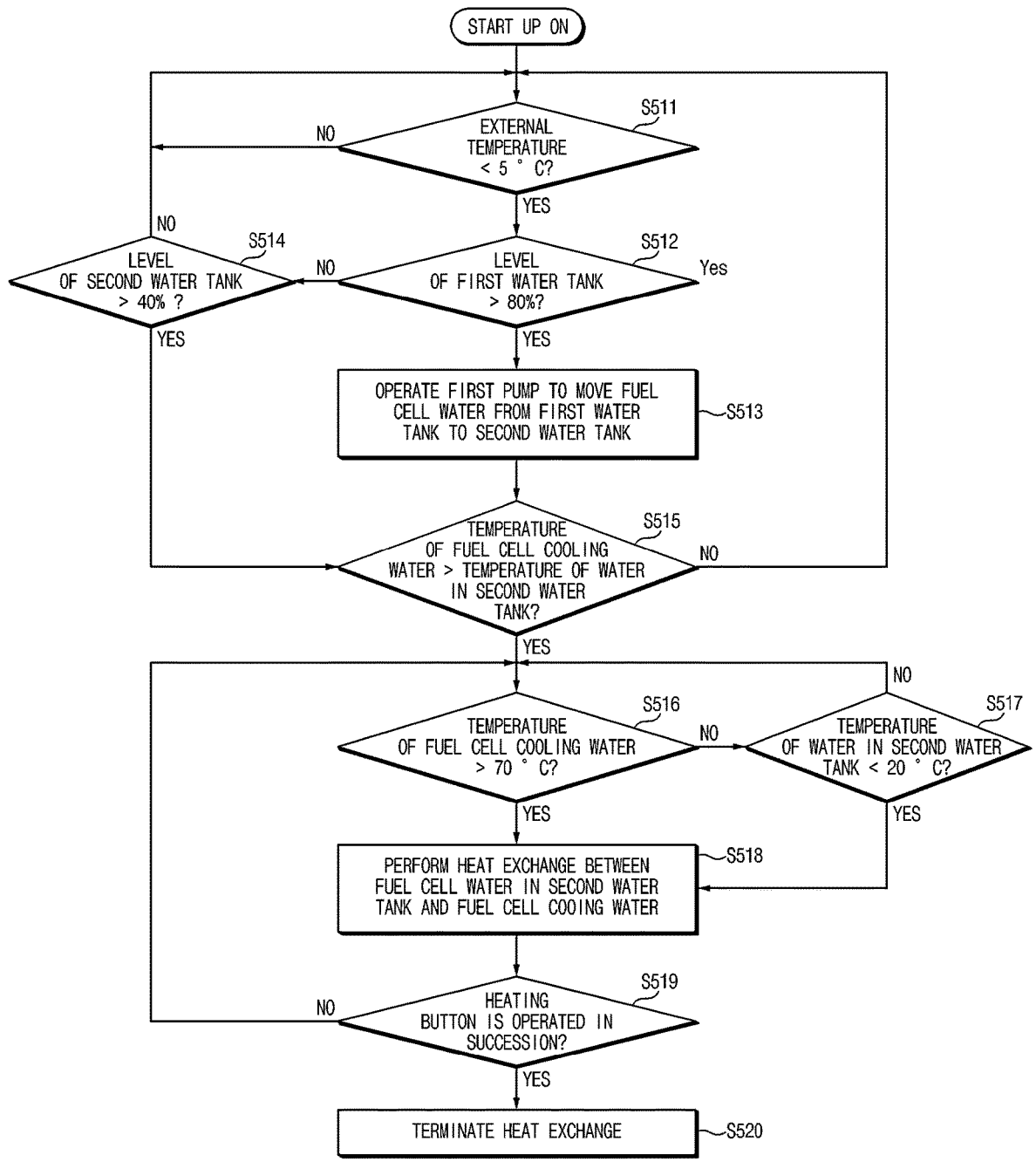
FIG. 5 is a flowchart for describing a process of increasing the temperature of the fuel cell water in the fuel cell water treatment system of FIG. 1.

FIG. 5 is a flowchart for describing a process of increasing the temperature of the fuel cell water in the fuel cell water treatment system of FIG. 1.

When the hydrogen electric vehicle is started up (ON), the cold/hot controller 50 may determine whether the external temperature of the hydrogen electric vehicle is lower than a preset temperature (S511).

For example, the cold/hot controller 50 may determine, on the basis of the information from the outdoor air sensor 12, whether the external temperature of the hydrogen electric vehicle is lower than 5° C.

When the external temperature is lower than the preset temperature in the determination result in operation S511, the cold/hot controller 50 may determine whether the level of the first water tank 22 exceeds a preset level on the basis of the information received from the level sensor LS1 installed in the first water tank 22 (S512).

For example, the cold/hot controller 50 may determine whether the level of the first water tank 22 exceeds 80% of the highest level.

When the level of the first water tank 22 exceeds 80% of the highest level in the determination result in operation S512, the cold/hot controller 50 may operate the first pump 26 to move the fuel cell water stored in the first water tank 22 to the second water tank 28 (S513).

In this case, the cold/hot controller 50 may move the fuel cell water until the level of the first water tank 22 reaches the reference value (80%) in operation S512 or reaches a level lower than 80% (for example, 60% of the highest level).

When the level of the first water tank 22 does not exceed 80% of the highest level in the determination result in operation S512, the cold/hot controller 50 may determine whether the level of the second water tank 28 exceeds the preset level (S514).

For example, the cold/hot controller 50 may determine whether the level of the second water tank 28 exceeds 40% of the highest level.

When the level of the second water tank 28 exceeds 40% of the highest level in operation S514 or the fuel cell water in the first water tank 22 is moved to the second water tank in operation S513, the cold/hot controller 50 may determine whether the temperature of the fuel cell water is higher than the temperature of the water in the second water tank 28 by comparing the temperature of the fuel cell water based on the information from the cooling water temperature sensor 14 and the temperature of the water in the second water tank 28 based on the temperature sensor TS2 of the second water tank 28 (S515).

In the present embodiment, even when the fuel cell water in the first water tank 22 is not moved to the second water tank, when it is determined that the amount of the fuel cell water stored in the second water tank 28 is sufficient to be used as washing water, the cold/hot controller 50 may perform operation S515 to increase the temperature of the fuel cell water.

When the temperature of the fuel cell water is higher than the temperature of the water in the second water tank 28 in the determination result in operation S515, the cold/hot controller 50 may determine whether the temperature of the fuel cell water is higher than the preset temperature (S516).

For example, the cold/hot controller 50 may determine whether the temperature of the fuel cell water is higher than 70° C.

When the temperature of the fuel cell water is not higher than 70° C. in the determination result in operation S516, the cold/hot controller 50 may determine whether the temperature of the water in the second water tank 28 is lower than the preset temperature (S517).

For example, the cold/hot controller 50 may determine whether the temperature of the water in the second water tank 28 is lower than 20° C.

When the temperature of the fuel cell water is higher than 70° C. in the determination result in operation S516 or the temperature of the water in the second water tank 28 is lower than 20° C. in the determination result in operation S517, the cold/hot controller 50 may perform heat exchange between the fuel cell cooling water and the fuel cell water in the second water tank 28 (S518).

For example, the cold/hot controller 50 may output the second flow control signal to the cooling water valve 44 to cut off the connection between port ① and port ③ and connect port ① and port ② in the cooling water valve 44 so that the cooling water in the cooling water line L2 may be introduced into the second heat exchanger HE2 via the connection line CL3. The cold/hot controller 50 may operate the second heat exchanger HE2 to allow the heat exchange between the cooling water in the second heat exchanger HE2 and the fuel cell water in the second water tank 28 so as to increase the temperature of the fuel cell water and decrease the temperature of the fuel cell cooling water.

In the present embodiment, when the temperature of the fuel cell cooling water is higher than 70° C., the cold/hot controller 50 may perform the heat exchange in operation S518 to decrease the temperature of the fuel cell cooling water regardless of the temperature of the water in the second water tank 28. However, when the temperature of the fuel cell cooling water is not higher than 70° C., the cold/hot controller 50 may selectively perform the heat exchange in operation S518 according to the temperature of the water in the second water tank 28.

When the increasing of the temperature of the fuel cell water in the second water tank 28 through the heat exchange starts, the cold/hot controller 50 may output a message informing of this fact to the cluster to inform a user of this fact. In addition, when a user does not want to increase the temperature of the fuel cell water, the cold/hot controller 50 may output a message to press the heating button together in succession to the cluster.

When the heating button is operated in succession while the heat exchange between the fuel cell water and the fuel cell cooling water is performed (S519), the cold/hot controller 50 may terminate the heat exchange (S520). In this case, the cooling water valve 44 may block flow of the cooling water to port ② and allow port ① and port ③ to communicate with each other again.

When the heating button is not operated in succession, the cold/hot controller 50 may continuously perform the heat exchange until the temperature of the fuel cell cooling water reaches the reference value (70° C.) in operation S516 or the temperature of the water in the second water tank 28 reaches the reference value (20° C.) in operation S517.

In the present embodiment, it has been described that, when a user operates the heating button in succession, the heat exchange is terminated. However, this is merely an embodiment, and the heat exchange may be terminated through another separate switching device or a menu.

Thereafter, when a user operates the faucet lever of the washing device 34, the second pump 32 is automatically operated, and thus the heated fuel cell water in the second water tank 28 may be discharged to the washstand through the faucet head of the washing device 34. The fuel cell water discharged through the faucet head and used as the washing water may be stored in the waste water tank 36 through the drain pipe of the washstand.

In the above-described embodiment, it has been described that the cold/hot controller 50 automatically performs the heat exchange according to the external temperature of the hydrogen electric vehicle and the states of the fuel cell water and the fuel cell cooling water. However, when a user requests a temperature increase through a separate switching device (or a menu), the cold/hot controller 50 may perform the heat exchange between the fuel cell water and the fuel cell cooling water regardless of the above-described conditions.

In the above-described embodiment, a case in which the fuel cell water treatment system of the present disclosure is applied to the hydrogen electric vehicle has been described as an example. However, the fuel cell water treatment system may be applied to all mobilities (for example, ships, aircrafts, trains, and the like) using a hydrogen fuel cell as a power source.

According to an embodiment of the present disclosure, the temperature of fuel cell water generated in a hydrogen fuel cell is appropriately adjusted according to an external environment, and thus a user may appropriately use the fuel cell water as washing water.

Further, according to an embodiment of the present disclosure, fuel cell cooling water is cooled using the fuel cell water, and thus cooling efficiency of a hydrogen electric vehicle may be further improved.

The above description is merely illustrative of the technical spirit of the present disclosure, and those having ordinary skill in the art to which the present disclosure belongs may make various modifications and changes without departing from the essential features of the present disclosure.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A fuel cell water treatment system comprising:
   a first water tank configured to receive and store fuel cell water from a fuel cell and detect a level and temperature of the stored fuel cell water;
   a second water tank which is configured to receive and store the fuel cell water from the first water tank and detect a level and temperature of the stored fuel cell water; wherein heat exchange is performed between the fuel cell water in the second water tank and a fluid introduced from an outside;
   a first pump configured to move the fuel cell water stored in the first water tank to the second water tank;
   an outdoor air sensor configured to detect an external temperature;
   a temperature adjustment device configured to;
     control the heat exchange in the second water tank,
     control movement of the fuel cell water from the first water tank to the second water tank, and
     adjust the temperature of the fuel cell water stored in the second water tank based on the external temperature provided from the outdoor air sensor and state information on the fuel cell water in the first water tank and the second water tank; and
   a washing device configured to receive the fuel cell water from the second water tank and discharge the fuel cell water through a faucet head.

2. The fuel cell water treatment system of claim 1, wherein the temperature adjustment device outputs a message for notifying of the temperature adjustment to a user when the temperature adjustment of the fuel cell water stored in the second water tank is performed.

3. The fuel cell water treatment system of claim 1, wherein the temperature adjustment device is configured to:
   determine whether a level of the first water tank is higher than a preset first level when the external temperature is higher than a preset first temperature;
   adjust a temperature of the fuel cell water stored in the second water tank based on a temperature of water in and a level of the second water tank after moving the fuel cell water in the first water tank to the second water tank based on a temperature of water in and the level of the first water tank when the level of the first water tank is higher than the first level; and adjust the temperature of the fuel cell water stored in the second water tank based on the temperature of the water in and the level of the second water tank without moving the fuel cell water when the level of the first water tank is equal to or lower than the first level.

4. The fuel cell water treatment system of claim 3, wherein the temperature adjustment device is configured to operate the first pump to move the fuel cell water in the first water tank to the second water tank when the temperature of the water in the first water tank is equal to or lower than a preset second temperature or when the temperature of the water in the first water tank is higher than the second temperature and the level of the first water tank is higher than a preset second level, when the level of the first water tank is higher than the first level.

5. The fuel cell water treatment system of claim 3, wherein the temperature adjustment device is configured to allow an air conditioner refrigerant to be introduced into the second water tank to cool the fuel cell water stored in the second water tank.

6. The fuel cell water treatment system of claim 5, wherein the temperature adjustment device includes:
a first valve configured to introduce the air conditioner refrigerant into a first heat exchanger installed in the second water tank according to a first flow control signal; and
a cold/hot controller configured to selectively generate the first flow control signal based on the external temperature and the temperature of the water in and the level of the second water tank and output the generated first flow control signal to the first valve.

7. The fuel cell water treatment system of claim 6, wherein the cold/hot controller is configured to generate the first flow control signal when the level of the second water tank is higher than a preset third level and the temperature of the water in the second water tank is higher than a preset third temperature.

8. The fuel cell water treatment system of claim 3, wherein the temperature adjustment device is configured to adjust the temperature of the fuel cell water stored in the second water tank when an air conditioner is operated for a preset time or more.

9. The fuel cell water treatment system of claim 1, wherein the temperature adjustment device is configured to:
determine whether a level of the first water tank is higher than a preset first level when the external temperature is lower than a preset first temperature;
adjust a temperature of the fuel cell water stored in the second water tank based on a temperature of fuel cell cooling water and a temperature of water in the second water tank after moving the fuel cell water in the first water tank to the second water tank when the level of the first water tank is higher than the first level; and
adjust the temperature of the fuel cell water stored in the second water tank based on the temperature of the fuel cell cooling water and the temperature of water in and a level of the second water tank without moving the fuel cell water when the level of the first water tank is not higher than the first level.

10. The fuel cell water treatment system of claim 9, wherein the temperature adjustment device is configured to operate the first pump to move the fuel cell water in the first water tank to the second water tank when the level of the first water tank is higher than the first level.

11. The fuel cell water treatment system of claim 9, wherein the temperature adjustment device is configured to adjust the temperature of the fuel cell water stored in the second water tank when the level of the first water tank is equal to or lower than the first level and the level of the second water tank is higher than a preset second level.

12. The fuel cell water treatment system of claim 11, wherein the temperature adjustment device includes:
a second valve configured to allow the fuel cell cooling water to be introduced into a second heat exchanger installed in the second water tank according to a second flow control signal; and
a cold/hot controller configured to selectively generate the second flow control signal based on the external temperature, the temperature of the fuel cell cooling water, and the temperature of the water in and the level of the second water tank and configured to output the generated second flow control signal to the second valve.

13. The fuel cell water treatment system of claim 12, wherein the cold/hot controller is configured to generate the second flow control signal when the temperature of the fuel cell cooling water is higher than the temperature of the water in the second water tank and the temperature of the fuel cell cooling water is higher than a preset second temperature.

14. The fuel cell water treatment system of claim 12, wherein the cold/hot controller is configured to generate the second flow control signal when the temperature of the water in the second water tank is lower than a preset third temperature when the temperature of the fuel cell cooling water is higher than the temperature of the water in the second water tank and the temperature of the fuel cell cooling water is equal to or lower than a preset second temperature.

15. The fuel cell water treatment system of claim 1, wherein the temperature adjustment device is configured to allow an air conditioner refrigerant to be introduced into the second water tank so as to cool the fuel cell water stored in the second water tank based on the level of and the temperature of the water in the second water tank when the external temperature is higher than a preset first temperature.

16. The fuel cell water treatment system of claim 1, further comprising:
a second pump configured to operate based on an operation of a faucet lever of the washing device to discharge the fuel cell water stored in the second water tank through the faucet head; and
a waste water tank connected to a washstand of the washing device and configured to store waste water discharged through a drain pipe of the washstand.

* * * * *